US00RE37522E

(19) United States
(12) Reissued Patent
Karnopp et al.

(10) Patent Number: US RE37,522 E
(45) Date of Reissued Patent: Jan. 22, 2002

(54) BRAKE CONTROLLING SYSTEM

(75) Inventors: Dean C. Karnopp; Yoshiyuki Yasui, both of Davis, CA (US)

(73) Assignee: Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

(21) Appl. No.: 09/385,001

(22) Filed: Aug. 27, 1999

Related U.S. Patent Documents

Reissue of:
(64) Patent No.: 4,898,431
Issued: Feb. 6, 1990
Appl. No.: 07/206,735
Filed: Jun. 15, 1988

(51) Int. Cl.[7] ..... B60T 8/60; B60T 8/58
(52) U.S. Cl. ..... 303/146; 303/140; 303/147
(58) Field of Search ..... 303/121–199; 188/181 C; 180/197; 701/41, 48, 49, 72, 71, 82, 83, 90, 80, 75

(56) References Cited

U.S. PATENT DOCUMENTS

| | | | | |
|---|---|---|---|---|
| 3,895,683 A | | 7/1975 | Lang et al. | |
| 3,908,782 A | | 9/1975 | Lang et al. | |
| 3,993,362 A | * | 11/1976 | Kamins et al. | |
| 4,023,864 A | | 5/1977 | Lang et al. | |
| 4,480,309 A | * | 10/1984 | Burckhardt et al. | 303/140 |
| 4,484,280 A | * | 11/1984 | Brugger et al. | 701/83 |
| 4,489,382 A | * | 12/1984 | Jonner et al. | 701/83 |
| 4,509,802 A | * | 4/1985 | Solleder et al. | 303/139 |
| 4,589,511 A | | 5/1986 | Leiber | |
| 4,593,955 A | * | 6/1986 | Leiber | 303/148 |
| 4,657,314 A | * | 4/1987 | Leiber | 303/147 |
| 4,758,053 A | * | 7/1988 | Yasuno | |
| 4,794,539 A | | 12/1988 | Wallentowitz et al. | |
| 4,809,181 A | * | 2/1989 | Ito et al. | 303/146 |
| 4,809,183 A | * | 2/1989 | Eckert | 303/140 |
| 4,836,618 A | | 6/1989 | Wakata et al. | |
| 4,898,431 A | * | 2/1990 | Karnopp et al. | |
| 5,000,521 A | | 3/1991 | Majima et al. | |
| 5,332,300 A | | 7/1994 | Hartmann et al. | |

FOREIGN PATENT DOCUMENTS

| | | |
|---|---|---|
| DE | 21 12 669 | 10/1972 |
| DE | 2360913 | * 12/1973 |
| DE | 19 02 944 | 2/1978 |

(List continued on next page.)

OTHER PUBLICATIONS

SAE Publication 960487 published in 1996 entitled "Vehicle Stability Control in Limit Cornering by Active Brake", Kolbuchl et al.*

SAE Technical Paper No. 852184, "A Study On Vehicle Turning Behavior in Acceleration and in Braking" by Masato Abe, pp. 75–86, published 1985.*

"Bosch Technische Berichte", Band 7 (1980) Heft 1, ISSN 0006–789 X, pp. 40–49.

"Fahrwerktechnik: Fahverhalten", Würzburg: Vogel, 1987 (Vogel–Fachbuch), ISBN 3–8023–0774–7, pp. 96–97.

"ASR–Traction Control–A Logical Extension of ABS", *SAE Technical Paper Series,* 870337, International Congress and Exposition, Detroit, Michigan, Feb. 23–27, 1987, pp. 1–7.

(List continued on next page.)

*Primary Examiner*—Douglas C. Butler
(74) *Attorney, Agent, or Firm*—Burns, Doane, Swecker & Mathis, LLP

(57) ABSTRACT

The present invention relates to an apparatus and method for controlling vehicle motion. More specifically, the invention relates to an apparatus for improving vehicle stability by controlling the brake torque of a vehicle during, for example, cornering manuevers. In accordance with the present invention, vehicle stability is improved by independently controlling brake torque in response to sensed yaw rate.

34 Claims, 4 Drawing Sheets

FOREIGN PATENT DOCUMENTS

| | | | |
|---|---|---|---|
| DE | 35 18 221 | | 11/1985 |
| DE | 3602432 | * | 7/1987 |
| DE | 36 25 392 | | 8/1987 |
| DE | 36 16 907 | | 11/1987 |
| DE | 37 31 756 | | 3/1989 |
| DE | 34 21 776 | | 9/1993 |
| GB | 1 383 553 | | 2/1975 |
| JP | 50-13530 | | 5/1975 |
| JP | 60-66569 | | 5/1985 |
| JP | 60-161258 | | 8/1985 |
| JP | 60-169768 | | 9/1985 |
| JP | 61-102361 | | 5/1986 |
| JP | 61-150856 | | 7/1986 |
| JP | 0232952 | * | 10/1986 |
| JP | 61-229616 | | 10/1986 |
| JP | 61-196825 | | 12/1986 |
| JP | 62-253559 | | 11/1987 |
| JP | 62-286834 | | 12/1987 |
| JP | 62-299430 | | 12/1987 |
| JP | 63-13851 | | 1/1988 |

OTHER PUBLICATIONS

English language translations of papers filed on connection with prosecution/opposition proceedings of Japanese Application Nos. 1–152870, 8–23185 and 11–84547, and German Application Nos. 3919347 and 3943776.

* cited by examiner

BRAKE CONTROLLING SYSTEM

Matter enclosed in heavy brackets [ ] appears in the original patent but forms no part of this reissue specification; matter printed in italics indicates the additions made by reissue.

BACKGROUND OF THE INVENTION

The present invention generally relates to an apparatus and method for controlling vehicle motion. More specifically, the invention relates to an apparatus for improving vehicle stability by controlling the brake torque of a vehicle during, for example, cornering.

During vehicle motion such as cornering, both longitudinal forces (i.e., front to back) and lateral forces (i.e., side to side) influence the lateral and longitudinal behavior of the vehicle, as noted in the article "A Study On Vehicle Turning Behavior in Acceleration and in Braking", SAE Technical Paper No. 852184, pages 75–86, by Masato Abe which is hereby incorporated by reference. As further noted in the article, complicated equations of motion are involved in describing the combined lateral and longitudinal behavior of the vehicle, because many of the steady state equilibrium conditions which may exist during a constant speed mode of operation might not exist during vehicle braking or acceleration.

The varying longitudinal forces which affect vehicle stability during braking or acceleration have a tendency to cause the rear wheels of a vehicle to lock during braking due to a varying decrease in the rear wheel load. In order to prevent this rear wheel lock from occurring, some prior art brake control systems include a proportioning valve to adjust the amount of braking in proportion to the longitudinally changing loads of the front of the vehicle relative to the back of the vehicle.

Although the use of such a proportioning valve helps to prevent rear wheel lock from occurring during braking due to longitudinally changing load forces, it does not sufficiently adjust the braking action at the vehicle wheels to compensate for vehicle load changes that are due to lateral, i.e., side to side, forces. When a vehicle is undergoing a cornering maneuver, for example, there is not only a longitudinal load shift in a tangential direction to the vehicle's path of motion, but there is also a lateral load shift in a direction which is normal to the vehicle's path of motion. Such a lateral load shift is transferred, for example, from the wheels located on the inside of the curve in the vehicle's path to the wheels located on the outside of the curve in the vehicle's path. It is this lateral load shift which urges the vehicle out of its current path as defined by an existing radius of curvature, and into an oversteer or an understeer condition.

In the aforementioned article by Masato Abe, a study of the affect of acceleration and braking on vehicle turning behavior is presented. In this study, equilibrium equations of vehicle motion for constant lateral and longitudinal accelerations which describe the vehicle turning behavior during acceleration and braking are developed. The equations derived are used to obtain the radii of curvature of the vehicle path versus vehicle forward speed during constant acceleration or braking in turns. The vehicle turning behavior is also described by a characteristic line representing the lateral acceleration versus the longitudinal acceleration for a circular turning maneuver. For example, FIGS. 5–7 of the article reflect that for a given steering wheel angle, increased deceleration due to, for example, braking action (as reflected by negative acceleration in the FIGS. 5–7), results in a change from an understeer condition (i.e., an increase in turning radius), to an increasingly severe oversteer condition (i.e., a decrease in turning radius), with increased vehicle speed.

Although the prior art has recognized that longitudinal forces as well as lateral forces affect the vehicle motion during cornering, there is a need to provide a vehicle motion control system which will actually compensate for the lateral forces that detrimentally influence vehicle stability during the course of vehicle motion.

SUMMARY OF THE INVENTION

Accordingly, it is an object of the present invention to overcome the deficiencies of the prior art by providing a novel apparatus and method for improving vehicle stability. In accordance with the invention, vehicle motion is controlled through the use of a brake controlling system which compensates for the influence of lateral forces on the vehicle.

More specifically, an apparatus for controlling vehicle motion is provided which independently controls braking torque in response to a sensed actual yaw rate. In a preferred embodiment, the apparatus for controlling motion includes a means for measuring the actual yaw rate of the vehicle. The apparatus also includes a means for determining a desired yaw rate of the vehicle and for producing an output signal in response to a comparison of the desired yaw rate with the actual yaw rate. The desired yaw rate is determined on the basis of the vehicle's steering angle and velocity. Accordingly, a first sensor means is provided for detecting the steering angle at which the vehicle is turning, and a second sensor means is provided for detecting vehicle speed. The second sensor means includes a plurality of wheel speed sensors for detecting the speed of rotation of each vehicle wheel independently so that an accurate indication of vehicle speed can be obtained from the average of the wheel speed sensor outputs.

The output signal produced in response to the comparison of a desired yaw rate with an actual yaw rate is applied to a braking control means. Based on this output signal, the braking control means maintains the handling characteristics of the vehicle neutral (i.e., prevents oversteer or understeer) or, at the most, permits only negligible understeer to occur during a maneuver such as cornering.

More specifically, if there is a discrepancy between the measured yaw rate and the desired yaw rate, the existence of lateral forces which could detrimentally influence vehicle motion is indicated. If the measured yaw rate is determined to be less than the desired yaw rate, the brake controlling means will increase the brake force applied to the vehicle's wheels which face the inside of a curve in a vehicle's path and/or decrease the brake force applied to the vehicle's wheels which face the outside of the curve. On the other hand, if the measured yaw rate is greater than the desired yaw rate, the brake controlling means will decrease the brake force applied to the inside wheels of the vehicle and/or increase the brake force applied to the outside wheels. However, if the output signal indicates that the actual yaw rate and the desired yaw rate are equal, then no action is taken.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DESCRIPTION OF THE PREFERRED EMBODIMENTS

Figure 1:
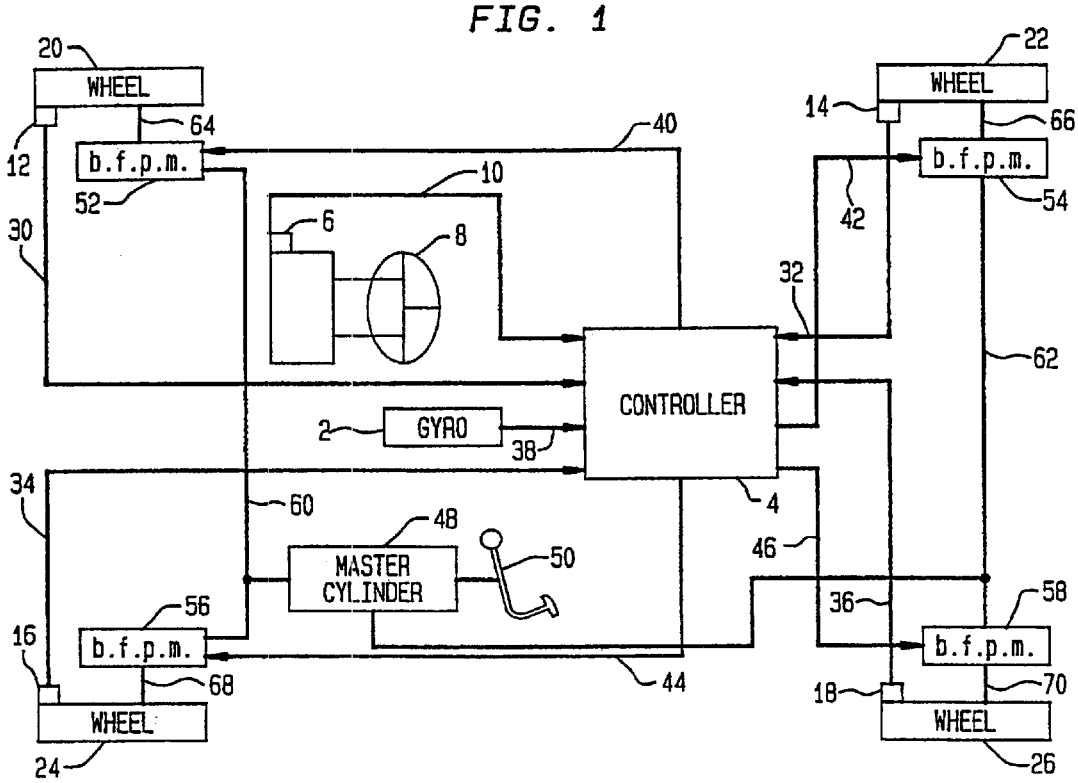
FIG. 1 shows a schematic diagram of one embodiment of a brake controlling system for stabilizing motion in a motor vehicle.

FIG. 1 shows a schematic diagram of a preferred embodiment of a brake controlling system for stabilizing vehicle motion according to the present invention. The FIG. 1 apparatus includes a means for measuring an actual yaw rate of a vehicle which includes a yaw rate gyro 2. The yaw rate gyro is arranged on or near the center of gravity of the motor vehicle body and is responsive to the influence of destabilizing forces on the vehicle.

The FIG. 1 apparatus also includes a means for determining a desired yaw rate of the vehicle and for producing an output signal in response to a comparison of the desired yaw rate and the actual yaw rate. The means for determining a desired yaw rate includes a controller 4 which responds to input signals from a first sensor means for detecting a steering angle of the vehicle and a second sensor means for detecting vehicle speed. The first sensor means includes a steering angle sensor 6 associated with a vehicle steering wheel 8. The second sensor means includes the wheel speed sensors 12, 14, 16 and 18 which are associated with the individual wheels 20, 22, 24 and 26, respectively. The steering angle sensor 6 provides an input signal to the controller 4 via the line 10, which is indicative of a turning angle of the vehicle. The wheel speed sensors 12, 14, 16 and 18 provide the controller 4 with an indication of the individual wheel speed for each of the wheels 20, 22, 24 and 26, via the lines 30, 32, 34 and 36, respectively.

The controller 4 also receives the measured yaw rate from the yaw rate gyro 2 via the line 38 so that it can then produce an output signal in response to a comparison of the desired yaw rate with the actual yaw rate. The output signal is supplied as an input to a brake controlling means via the output lines 40, 42, 44 and 46 of the controller 4.

Referring to FIG. 1, the brake controlling means includes a brake master cylinder 48 which is associated with a manually operated brake pedal 50. The brake master cylinder in turn controls four brake fluid pressure modulators 52, 54, 56 and 58 via the lines 60 and 62, in response to depression of the brake pedal. The brake fluid pressure modulators increase or decrease the brake fluid pressure in each of the brake fluid lines 64, 66, 68 and 70, respectively. An increase or decrease in each of the brake fluid lines 64, 66, 68 and 70 will in turn increase or decrease the braking action of brake actuators in known fashion at each of the wheels 20, 22, 24, and 26, respectively.

Based on the result of the comparison performed within the controller 4, the brake fluid pressure in each of the brake fluid lines 64, 66, 68 and 70 is adjusted to maintain vehicle stability despite the occurrence of lateral forces during, for example, vehicle cornering. The brake controlling system of FIG. 1 can also be adapted to incorporate a known proportioning valve so that longitudinal forces which may affect vehicle stability will simultaneously be compensated.

Figure 2:
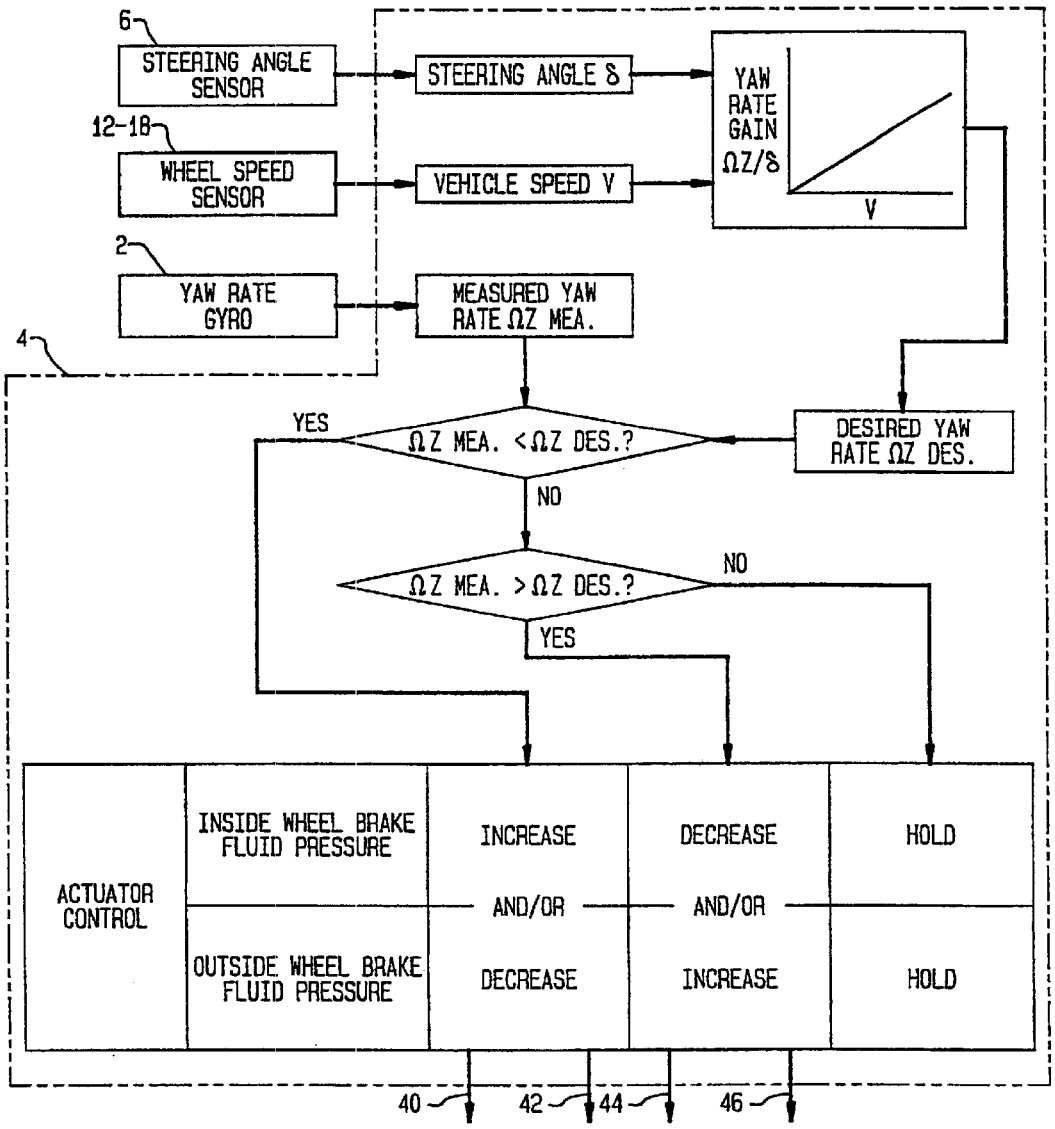
FIG. 2 shows a flow chart for the system shown in FIG. 1.

A more specific discussion of the operation of the FIG. 1 apparatus will now be provided in conjunction with the flow chart of FIG. 2. The controller 4 of FIG. 1 receives the actual yaw rate from the yaw rate gyro 2 as mentioned above. In order to perform the aforementioned comparison of the actual yaw rate with the desired yaw rate, the controller 4 must first determine the desired yaw rate. Accordingly, the controller 4 receives an individual wheel speed signal from each of the wheel speed sensors 12, 14, 16 and 18, and calculates the vehicle speed, designated V, from the average of the values received as shown in FIG. 2. Using the calculated vehicle speed V in conjunction with the vehicle steering angle, designated δ as received from the steering angle sensor 6, the controller 4 calculates a desired yaw rate designated Ωzdes in accordance with the following equation:

$$\frac{\Omega zdes}{\delta} = \frac{V}{L + K_{us}\frac{V^2}{g}} \tag{1}$$

wherein L corresponds to the wheelbase of the vehicle; g, corresponds to the acceleration due to gravity, (i.e., 9.8 $m/s^2$); and, $K_{us}$ corresponds to the understeer coefficient, (i.e., stability factor), of the vehicle. These constants provide the linear gain depicted in the box entitled "yaw rate gain" of FIG. 2. In order to maintain neutral handling characteristics of the vehicle, (i.e., avoid an oversteer or an understeer condition while cornering), or at the least, limit the handling characteristics to a negligible understeer, $K_{us}$ should be chosen to be within the range of 0 to 1 degree.

The desired yaw rate is periodically updated by the controller at a rate defined by the controller's clock. The updated desired yaw rate is then compared with a current measure of the actual yaw rate in the controller 4 so that vehicle stability will be maintained during vehicle motion. During the comparison, if the measured yaw rate does not equal the desired yaw rate, the controller 4 outputs signals via the lines 40, 42, 44 and 46 to the brake fluid pressure modulators 52, 54, 56 and 58 of FIG. 1, respectively. The brake fluid pressure modulators in turn modify the brake fluid pressure in each of the lines 64, 66, 68 and 70, respectively. If however, the measured yaw rate is equal to the desired yaw rate, no action is taken. Accordingly, the controller 4 is placed in a "hold" status as indicated in FIG. 2 so that the brake fluid pressure modulators 52, 54, 56 and 58 will maintain the current stabilized state of the vehicle.

More specifically, if the measured yaw rate is less than the desired yaw rate while the vehicle is, for example, undergoing a cornering maneuver, the controller 4 will signal the brake fluid pressure modulators to increase the braking force applied by brake actuators to the wheels located on the inside of the curve in the vehicle's path of travel and/or to decrease the braking force applied by brake actuators to the wheels located on the outside of the curve as shown in FIG. 2. Referring to the FIG. 1 apparatus, if, for example, the wheels 24 and 26 are on the inside of a curve being travelled by the vehicle, the controller 4 would signal the brake fluid pressure modulators 56 and 58 to increase the braking force applied to the wheels 24 and 26 via the lines 68 and 70, and/or signal the brake fluid pressure modulators 52 and 54 to decrease the braking force applied to the wheels 20 and 22 via the lines 64 and 66. This relative adjustment between the braking force applied to the wheels on one side of the vehicle versus the braking force applied to the wheels on the other side of the vehicle would be made in proportion to the magnitude of the difference between the measured yaw rate and the desired yaw rate, and would continue until these latter two values were once again equal. As can be seen from the above discussion, the relative braking force applied to the wheels 20, 22, 24 and 26 in order to maintain vehicle stability, can be achieved solely by compensating the braking force applied to either side of the vehicle or alternatively, can be achieved by simultaneously compensating the braking force applied to both sides of the vehicle.

If the measured yaw rate is determined by the controller 4 to be greater than the desired yaw rate as shown in FIG. 2, the controller 4 would signal the brake fluid pressure modulators 52, 54, 56 and 58 of FIG. 1 to decrease the braking force applied by brake actuators to the wheels on the inside of the curve in the vehicle's path of travel and/or to increase the braking force applied by brake actuators to the wheels on the outside of the curve. In the aforementioned example, the controller 4 would thus signal the brake fluid pressure modulators 56 and 58 to decrease the braking force applied to the wheels 24 and 26, and/or signal the brake fluid pressure modulators 52 and 54 to increase the braking force applied to the wheels 20 and 22. As noted previously, the relative braking force needed to obtain stabilized vehicle motion, could thus be obtained solely by compensating the braking force applied to the wheels on either side of the vehicle or alternatively, could be obtained by simultaneously compensating the braking force applied to the wheels on both sides of the vehicle.

By the above-described brake controlling system, vehicle motion can be stabilized against the influence of lateral load changes. Because the output signals from the controller 4 are applied to the brake fluid pressure modulators in response to yaw rate feedback independently of the brake master cylinder, vehicle stability can be maintained even when there is no brake pedal input. For example, during acceleration while in a cornering maneuver, the controller 4 would compensate for any lateral forces which might otherwise create an oversteer or an understeer condition. In addition, by including a known proportioning valve into the FIG. 1 brake controlling system as noted previously, longitudinal load forces affecting vehicle stability could be compensated simultaneously so that complete lateral and longitudinal stabilization would be obtained during vehicle motion.

Figure 3:
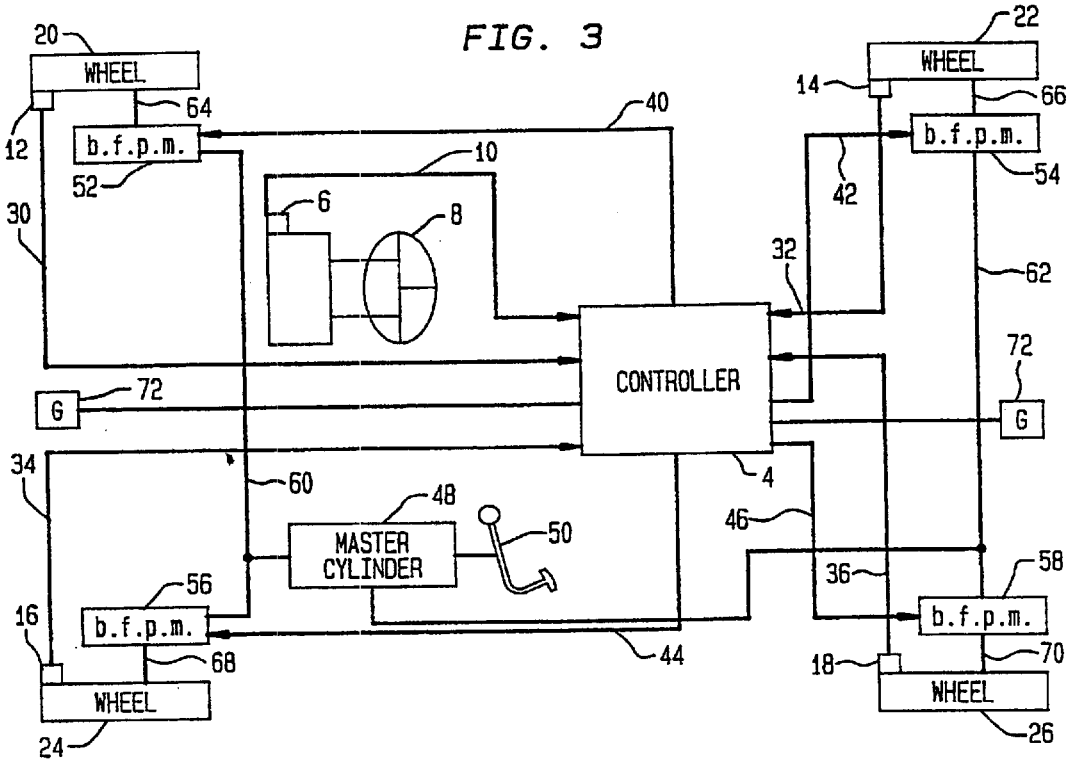
FIG. 3 shows a second embodiment of a brake controlling system for stabilizing motion in a motor vehicle.

Referring now to FIG. 3, a second embodiment of the present invention is shown wherein like elements with respect to FIG. 1 are assigned like numerals. In FIG. 3, the single yaw rate gyro of FIG. 1 is replaced with two side-direction G sensors, 72 and 74, for sensing G forces on the vehicle. As opposed to being placed on or near the vehicle body's center of gravity, the two side-direction G sensors are placed at the center of gravity of each of the front and rear ends of the motor vehicle body, respectively.

Figure 4:
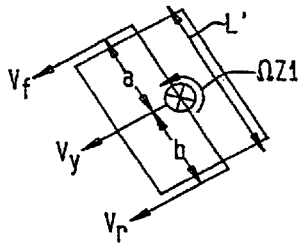
FIG. 4 shows a diagram of the forces used to calculate the yaw/rate from the sensors used in FIG. 3; and, FIG. 5 shows a flow chart for the system shown in FIG. 3.

The actual yaw rate in the FIG. 3 embodiment is measured in accordance with the diagram shown in FIG. 4 as follows:

$$\Omega zmeas = \frac{v_f - v_r}{L'} \tag{2}$$

wherein $v_f$ is the velocity component of the vehicle in a direction perpendicular to the travelling direction of the vehicle, and at the position of the side-direction G sensor 72 located at the front end of the vehicle as shown in FIG. 4; $v_r$ is the velocity component of the vehicle in a direction perpendicular to the traveling direction of the vehicle, and at the position of the side direction G sensor 74 located at the rear end of the vehicle; and, L' is a value corresponding to the distance between the side-direction G sensors.

The above equation for measuring the actual yaw rate is obtained by noting the existence of the following conditions in the FIG. 4 diagram:

$$v_f = v_y + a\ \Omega zmeas \tag{3}$$

$$v_r = v_y - b\Omega zmeas \tag{4}$$

wherein a is the distance between the position of the sidedirection G sensor 72 located at the front end of the motor vehicle body and the vehicle body's center of gravity; $v_y$ is the velocity component of the vehicle in a direction perpendicular to a travelling direction of the vehicle, and at the position of the center f gravity of the motor vehicle body; and, wherein b is the distance between the position of the side-direction G sensor 74 located at the rear end of the motor vehicle body and the vehicle body's center of gravity.

Equations (3) and (4) can be solved simultaneously to provide the following equation:

$$v_f - v_r = (a+b)\ \Omega zmeas. \tag{5}$$

Rearranging this equation, the above-noted equation (2) can be obtained as follows:

$$\Omega zmeas = \frac{v_f - v_r}{a+b} = \frac{v_f - v_r}{L'}$$

Figure 5:
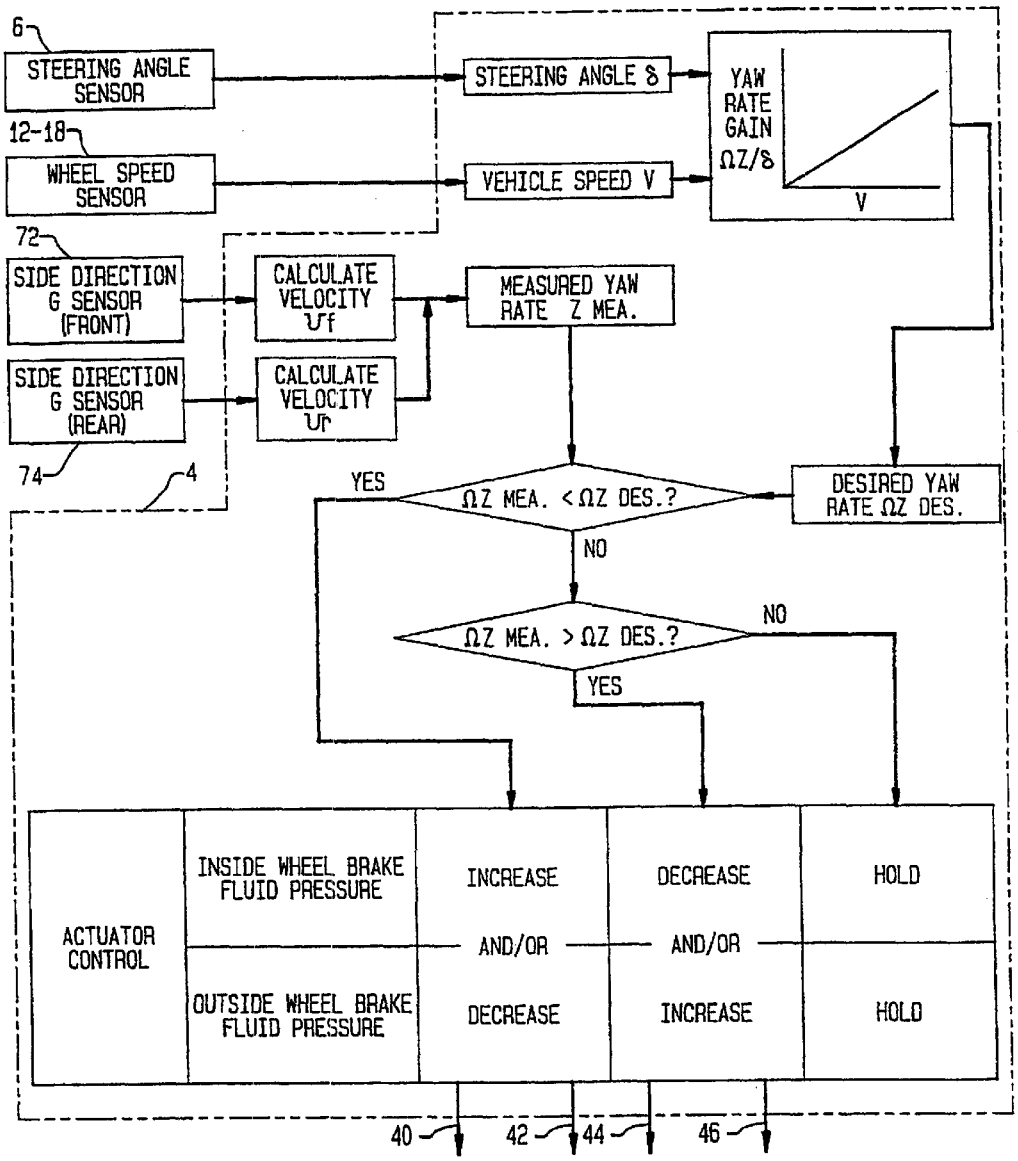

The operation of the FIG. 3 embodiment will now be discussed more specifically in conjunction with the flow chart of FIG. 5. For the most part, the operation of the FIG. 3 embodiment can be seen to correspond to that of FIG. 1 with the exception that the controller 4 of FIG. 3 receives two inputs from the side-direction G sensors, 72 and 74. As shown in FIG. 5, these inputs are used to calculate $v_f$ and $v_r$ as discussed above. Using the equation (2) above, the actual yaw rate is then determined by the controller 4 and compared with the desired yaw rate as discussed previously.

As shown in FIG. 5, when the measured yaw rate is determined to be less than the desired yaw rate while the vehicle is undergoing, for example, a cornering maneuver, the controller 4 will signal the brake fluid pressure modulators to increase the braking force applied by brake actuators to the wheels located on the inside of the curve in the vehicle's path and/or to decrease the braking force applied by brake actuators to the wheels located on the outside of the curve. If the measured yaw rate is determined by the controller 4 to be greater than the desired yaw rate, then the controller 4 would signal the brake fluid pressure modulators to decrease the braking force applied by brake actuators to the wheels located on the inside of the curve in the vehicle's path of travel and/or to increase the braking force applied by brake actuators to the wheels located on the outside of the curve. If the measured yaw rate and the desired yaw rate are equal, the braking force actuators are not compensated by an output from the controller 4.

In both the FIG. 1 and FIG. 3 embodiments discussed above, it should be noted that because the rear wheels of a vehicle are generally not used for steering, the brake fluid pressure modulators arranged in the rear brake fluid lines could be eliminated with only minimal effect on the lateral stability of the vehicle.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An apparatus for controlling a vehicle *having a plurality of wheels and a brake pedal,* comprising:

means responsive to the influence of destabilizing forces on a vehicle for measuring an actual yaw rate of said vehicle;

means for determining a dynamically variable target yaw rate of said vehicle and for producing an output signal in response to a comparison of said target yaw rate and said actual yaw rate; and brake controlling means, responsive to said output signal, for maintaining stability of the vehicle when said vehicle is in motion *to control a braking force applied to at least one of said plurality of wheels in the absence of brake pedal input, said brake controlling means including brake fluid pressure modulator means which responds to said output signal to modulate a braking force applied to at least one wheel on one side of said vehicle differently relative to a braking force applied to at least one wheel on an opposite side of said vehicle.*

2. The apparatus of claim 1, wherein said means for determining the [desired] *target yaw* rate includes a first sensor means for detecting a steering angle of said vehicle; and, a second sensor means for detecting vehicle speed.

3. The apparatus of claim 2, wherein said vehicle includes a plurality of wheels, and said second sensor means includes a wheel speed sensor for detecting the speed of rotation of each of said plurality of wheels.

4. The apparatus of claim 2, wherein said means for measuring said actual yaw rate of said vehicle includes a yaw rate gyro.

5. The apparatus of claim 2, wherein said means for measuring said actual yaw rate of said vehicle includes a pair of side-direction G sensors.

[6. The apparatus of claim 1, wherein said brake controlling means includes a brake fluid pressure modulator means which responds to said output signal to modulate a braking force applied to wheels on one side of said vehicle relative to a braking force applied to wheels on an opposite side of said vehicle, so as to counteract any influence of lateral forces.]

[7. The apparatus of claim 6, wherein said braking force applied to said wheels on one side of said vehicle relative to said braking force applied to said wheels on said opposite side of said vehicle is modulated in the absence of brake pedal input to said vehicle.]

8. The apparatus of claim [6] *1*, wherein said brake fluid pressure modulator means counteracts any influence of lateral forces by only modulating a braking force applied to wheels on one side of said vehicle.

9. The apparatus of claim [6] *1*, wherein said brake fluid pressure modulator means counteracts any influence of lateral forces by increasing the braking force applied to said one side of said vehicle while simultaneously decreasing the braking force applied to said opposite side of said vehicle.

10. A method for controlling vehicle motion *of a vehicle in which the vehicle has a plurality of wheels and a brake pedal,* comprising the steps of:

detecting an actual yaw rate of a vehicle;

determining a dynamically variable target yaw rate of said vehicle;

comparing said actual yaw rate with said target yaw rate to produce an output *signal*; and maintaining vehicle stability in response to said output signal during an influence of lateral forces on said vehicle *by controlling a braking force applied to at least one of said plurality of wheels in the absence of brake pedal input so as to modulate a braking force applied to at least one wheel on one side of said vehicle differently relative to a braking force applied to at least one wheel on an opposite side of said vehicle.*

[11. The method of claim 10, wherein said step of maintaining includes the step of:

controlling brake fluid pressure so as to modulate a braking force applied to wheels on one side of said vehicle relative to a braking force applied to wheels on an opposite side of said vehicle.]

12. The method of claim [11] *10*, wherein said step of controlling includes only modulating the braking force on either said one side of said vehicle or on said opposite side of said vehicle.

13. The method of claim [11] *10*, wherein said step of controlling includes simultaneously modulating the braking force on both said one side of said vehicle and said opposite side of said vehicle.

14. An apparatus for controlling vehicle motion *of a vehicle in which the vehicle has a plurality of wheels and a brake pedal,* comprising:

means for measuring an actual yaw rate of a vehicle;

means for determining a dynamically variable target yaw rate of said vehicle;

means responsive to said measuring means and said determining means for producing an output signal in response to a comparison of said target yaw rate and said actual yaw rate; and brake controlling means, responsive to said output signal, for maintaining vehicle stability at least partially in response to said output signal *to control a braking force applied to at least one of said plurality of wheels in the absence of brake pedal input, said brake controlling means including brake fluid pressure modulator means which responds to said output signal to modulate a braking force applied to at least one wheel on one side of said vehicle differently relative to a braking force applied to at least one wheel on an opposite side of said vehicle.*

*15. The apparatus of claim 1, wherein said means for determining a dynamically variable target yaw rate of said vehicle determines the dynamically variable target yaw rate of said vehicle using utilizing an understeer coefficient greater than zero.*

*16. The apparatus of claim 1, wherein said brake controlling means applies a braking force to only at least one of the wheels located on an outside of a curved path of travel of the vehicle when it is determined that the vehicle is in an oversteer condition in response to said comparison of said target yaw rate and said actual yaw rate.*

*17. The apparatus of claim 1, wherein said brake controlling means applies a braking force to at least one of the wheels located on an inside of a curved path of travel of the vehicle when it is determined that the vehicle is in an understeer condition in response to said comparison of said target yaw rate and said actual yaw rate.*

*18. The method of claim 10, wherein the dynamically variable target yaw rate of said vehicle is determined utilizing an understeer coefficient greater than zero.*

*19. The method of claim 10, wherein when said brake force is controlled by applying a braking force to only at*

*least one of the wheels located on an outside of a curved path of travel of the vehicle when it is determined that the vehicle is in an oversteer condition in response to said comparison of said target yaw rate and said actual yaw rate.*

*20. The method of claim 10, wherein said brake force is controlled by applying a braking force to at least one of the wheels located on an inside of a curved path of travel of the vehicle when it is determined that the vehicle is in an understeer condition in response to said comparison of said target yaw rate and said actual yaw rate.*

*21. The apparatus of claim 14, wherein said means for determining a dynamically variable target yaw rate of said vehicle determines the dynamically variable target yaw rate of said vehicle using utilizing an understeer coefficient greater than zero.*

*22. The apparatus of claim 14, wherein said brake controlling means applies a braking force to only at least one of the wheels located on an outside of a curved path of travel of the vehicle when it is determined that the vehicle is in an oversteer condition in response to said comparison of said target yaw rate and said actual yaw rate.*

*23. The apparatus of claim 14, wherein said brake controlling means applies a braking force to at least one of the wheels located on an inside of a curved path of travel of the vehicle when it is determined that the vehicle is in an understeer condition in response to said comparison of said target yaw rate and said actual yaw rate.*

*24. An apparatus for controlling a vehicle having a plurality of wheels, comprising:*

*means responsive to the influence of destabilizing forces on a vehicle for measuring an actual yaw rate of said vehicle;*

*means for determining a dynamically variable target yaw rate of said vehicle and for producing an output signal in response to a comparison of said target yaw rate and said actual yaw rate; and*

*brake controlling means, responsive to said output signal, for maintaining stability of the vehicle when said vehicle is in motion by controlling a braking force applied to at least one of said plurality of wheels during acceleration of said vehicle and while said vehicle is cornering, said brake controlling means including brake fluid pressure modulator means which responds to said output signal to modulate a braking force applied to at least one wheel on one side of said vehicle differently relative to a braking force applied to at least one wheel on an opposite side of said vehicle.*

*25. The apparatus of claim 24, wherein said brake controlling means applies a braking force to at least one of the wheels located on an outside of a curved path of travel of the vehicle when said actual yaw rate is greater than said target yaw rate.*

*26. The apparatus of claim 24, wherein said brake controlling means applies a braking force to at least one of the wheels located on an inside of a curved path of travel of the vehicle when said actual yaw rate is less than said target yaw rate.*

*27. An apparatus for controlling vehicle motion of a vehicle in which the vehicle has a plurality of wheels, comprising:*

*means for measuring an actual yaw rate of a vehicle;*

*means for determining a dynamically variable target yaw rate of said vehicle;*

*means responsive to said measuring means and said determining means for producing an output signal in response to a comparison of said target yaw rate and said actual yaw rate; and*

*brake controlling means, responsive to said output signal, for maintaining vehicle stability at least partially in response to said output signal by controlling a braking force applied to at least one of said plurality of wheels during acceleration of said vehicle and while said vehicle is cornering, said brake controlling means including brake fluid pressure modulator means which responds to said output signal to modulate a braking force applied to at least one wheel on one side of said vehicle differently relative to a braking force applied to at least one wheel on an opposite side of said vehicle.*

*28. The apparatus of claim 27, wherein said brake controlling means applies a braking force to at least one of the wheels located on an outside of a curved path of travel of the vehicle whenever said actual yaw rate is greater than said target yaw rate.*

*29. The apparatus of claim 27, wherein said brake controlling means applies a braking force to at least one of the wheels located on an inside of a curved path of travel of the vehicle when said actual yaw rate is less than said target yaw rate.*

*30. An apparatus for controlling a vehicle having a plurality of wheels and a brake pedal, comprising:*

*means responsive to the influence of destabilizing forces on a vehicle for measuring an actual yaw rate of said vehicle;*

*means for determining a dynamically variable target yaw rate of said vehicle and for producing an output signal in response to a comparison of said target yaw rate and said actual yaw rate; and*

*brake controlling means, responsive to said output signal, for maintaining stability of the vehicle when said vehicle is in motion by controlling a braking force applied to at least one of said plurality of wheels, said brake controlling means including a brake fluid pressure modulator means which responds to said output signal to modulate a braking force applied to wheels on one side of said vehicle differently relative to a braking force applied to wheels on an opposite side of said vehicle, so as to counteract any influence of lateral forces, said braking force applied to said wheels on one side of said vehicle relative to said braking force applied to said wheels on said opposite side of said vehicle being modulated in the absence of brake pedal input to said vehicle.*

*31. An apparatus for controlling a vehicle having a plurality of wheels and a brake pedal, comprising:*

*means responsive to the influence of destabilizing forces on a vehicle for measuring an actual yaw rate of said vehicle;*

*means for determining a dynamically variable target yaw rate of said vehicle and for producing an output signal in response to a comparison of said target yaw rate and said actual yaw rate; and*

*brake controlling means, responsive to said output signal, for maintaining stability of the vehicle when said vehicle is in motion by controlling a braking force applied to at least one of said plurality of wheels, said brake controlling means including a brake fluid pressure modulator means which responds to said output signal to modulate a braking force applied to at least one wheel on one side of said vehicle differently relative to a braking force applied to at least one wheel on an opposite side of said vehicle, so as to counteract any influence of lateral forces, said brake fluid pressure modulator means counteracting any influence of lateral*

*forces by increasing the braking force applied to said at least one wheel on said one side of said vehicle while simultaneously decreasing the braking force applied to said at least one wheel on said opposite side of said vehicle.*

*32. The apparatus of claim 31, wherein said pressure modulator means modulates the braking force applied to the wheels on one side of said vehicle relative to the braking force applied to the wheels on an opposite side of said vehicle.*

*33. An apparatus for controlling a vehicle having a plurality of wheels, comprising:*

*means responsive to the influence of destabilizing forces on a vehicle for measuring an actual yaw rate of said vehicle;*

*means for determining a dynamically variable target yaw rate of said vehicle and for producing an output signal in response to a comparison of said target yaw rate and said actual yaw rate; and*

*brake controlling means, responsive to said output signal, for maintaining stability of the vehicle when said vehicle is in motion by controlling a braking force applied to at least one of said plurality of wheels to increase a braking force applied to at least one of said plurality of wheels located on an outside of a curved path of travel of the vehicle to compensate for an oversteer condition when it is determined that the vehicle is in said oversteer condition in response to said comparison of said target yaw rate and said actual yaw rate.*

*34. The apparatus of claim 33, wherein said brake controlling means increases a braking force applied to only at least one of said plurality of wheels that is located on the outside of the curved path of travel when said actual yaw rate is greater than said target yaw rate.*

*35. An apparatus for controlling a vehicle having a plurality of wheels, comprising:*

*means responsive to the influence of destabilizing forces on a vehicle for measuring an actual yaw rate of said vehicle;*

*means for determining a dynamically variable target yaw rate of said vehicle and for producing an output signal in response to a comparison of said target yaw rate and said actual yaw rate; and*

*brake controlling means, responsive to said output signal, for maintaining stability of the vehicle when said vehicle is in motion by decreasing a braking force applied to only one or both of said plurality of wheels located on an inside of a curved path of travel of the vehicle when said actual yaw rate is greater than said target yaw rate.*

*36. The apparatus of claim 35, wherein said at least one of said plurality of wheels include front and rear wheels located on the inside of the curved path of the vehicle.*

*37. An apparatus for controlling a vehicle having a plurality of wheels and a brake pedal comprising:*

*means responsive to the influence of destabilizing forces on a vehicle for measuring an actual yaw rate of said vehicle;*

*means for determining a dynamically variable target yaw rate of said vehicle and for producing an output signal in response to a comparison of said target yaw rate and said actual yaw rate, respectively; and*

*brake controlling means, responsive to said output signal, for maintaining stability of the vehicle when said vehicle is in motion by controlling a braking force applied to at least one of said plurality of wheels in the absence of brake pedal input, said brake controlling means increasing the braking force applied to a first wheel of said plurality of wheels when it is determined that the vehicle is in an oversteer condition in response to said comparison of said target yaw rate and said actual yaw rate and increasing the braking force applied to a second wheel of said plurality of wheels different from said first wheel when it is determined that the vehicle is in an understeer condition in response to said comparison of said target yaw rate and said actual yaw rate.*

* * * * *